(12) United States Patent
Babiker et al.

(10) Patent No.: US 10,290,230 B2
(45) Date of Patent: May 14, 2019

(54) DEVICE SPECIFIC FINITE ELEMENT MODELS FOR SIMULATING ENDOVASCULAR TREATMENT

(71) Applicants: Arizona Board of Regents on Behalf of Arizona State University, Scottsdale, AZ (US); Mayo Foundation for Medical Education and Research, Rochester, MN (US)

(72) Inventors: Mohamed Haithem Babiker, Tempe, AZ (US); David H. Frakes, Scottsdale, AZ (US); Brian W. Chong, Scottsdale, AZ (US)

(73) Assignees: ARIZONA BOARD OF REGENTS ON BEHALF OF ARIZONA STATE UNIVERSITY, Scottsdale, AZ (US); MAYO FOUNDATION FOR MEDICAL EDUCATION & RESEARCH, Rochester, MN (US)

( * ) Notice: Subject to any disclaimer, the term of this patent is extended or adjusted under 35 U.S.C. 154(b) by 908 days.

(21) Appl. No.: 14/605,887

(22) Filed: Jan. 26, 2015

(65) Prior Publication Data
US 2015/0235569 A1 Aug. 20, 2015

Related U.S. Application Data

(60) Provisional application No. 61/996,972, filed on May 22, 2014, provisional application No. 61/996,971, filed on Jan. 27, 2014.

(51) Int. Cl.
*G09B 5/02* (2006.01)
*G09B 23/28* (2006.01)

(52) U.S. Cl.
CPC .............. *G09B 23/28* (2013.01); *G09B 5/02* (2013.01)

(58) Field of Classification Search
None
See application file for complete search history.

(56) References Cited

U.S. PATENT DOCUMENTS

| 7,371,067 | B2 | 5/2008 | Anderson et al. |
| 2008/0020362 | A1 | 1/2008 | Cotin et al. |
| 2012/0041318 | A1 | 2/2012 | Taylor |

FOREIGN PATENT DOCUMENTS

| WO | WO 2004/051604 A1 | 6/2004 |
| WO | WO 2006/020792 A2 | 2/2006 |

OTHER PUBLICATIONS

Gundert et al. (Annals of Biomedical Eng. (2011) vol. 39:1423-1437).*
Kakalis et al. (IEEE Transactions on Medical Imaging (2008) vol. 27:814-824).*
Fluent Gambit Introduction and General Information (Mar. 24, 2008-herinafter "Fluent/Gambit").*
Dequidt et al. (Medical Image Computing and Computer Assisted Intervention-MICCAI 2008:11th Intl. Conference, New York, NY; pp. 695-702).*
Babiker et al. (Journal of Biomechanics (2012) vol. 45:440-447).*
Ma et al. (Journal of Biomechanics (2012) vol. 45:2256-2263).*
International Search Report and Written Opinion issued in International Application No. PCT/US2015/012941 dated Apr. 24, 2015.
Babiker et al. "Finite element modeling of embolic coil deployment: Multifactor characterization of treatment effects on cerebral aneurysm hemodynarnics." Journal of Biomechanics 46 (2013) 2809-2816.
Babiker et al. "Investigation of the Influence of Coil Configuration on Cerebral Aneurysm Fluid Dynamics Using a Finite Element Approach." Poster 2013, 1 page.
Babiker et al. "Preoperative simulation of endovascular treatment for cerebral aneurysms." Neuro News. Aug. 2012, pp. 14-15.
Heller et al. "Crescent sign on magnetic resonance angiography revealing incomplete stent apposition: correlation with diffusion-weighted changes in stent-mediated coil embolization of aneurysms." J Neurosurg 115:624-632, 2011.
Hung et al. "Selective use of electrolytic detachable and fibered coils to embolize a wide-neck giant splenic artery pseudoaneurysm." Journal of Vascular Surgery. May 2005. pp. 889-892.
Lubicz et al. "Selective Endovascular Treatment of Intracranial Aneurysms with Sapphire Coils." AJNR Am J Neuroradiol 25:1368-1372, Sep. 2004.
Wakhloo et al. "Advances in Interventional Neuroradiology." Stroke, 2009; 40:e305-e312; originally published online Apr. 9, 2009. Downloaded from http://stroke.ahajournal.org on Apr. 3, 2014.
White et al. "Coils in a Nutshell: A Review of Coil Physical Properties." AJNR 29. Aug. 2008. pp. 1242-1246.

* cited by examiner

*Primary Examiner* — Lori A. Clow
(74) *Attorney, Agent, or Firm* — Knobbe Martens Olson & Bear, LLP

(57) ABSTRACT

Systems and methods provide a novel computational approach to planning the endovascular treatment of cardiovascular diseases. In particular, the invention simulates medical device deployment and hemodynamic outcomes using a virtual patient-specific anatomical model of the area to be treated, high-fidelity finite element medical device models and computational fluid dynamics (CFD). In an embodiment, the described approach investigates the effects of coil packing density, coil shape, aneurysmal neck size and parent vessel flow rate on aneurysmal hemodynamics. A processor may receive patient clinical data used to construct the relevant anatomical structure model. The processor may access medical device models constructed using finite element analysis and three dimensional beam analysis, and simulates the deployment of selected medical devices in the anatomical structure model. The selected medical device models and the anatomical structure model mesh, allowing the processor to simulate hemodynamic outcomes using computational fluid dynamics.

20 Claims, 12 Drawing Sheets

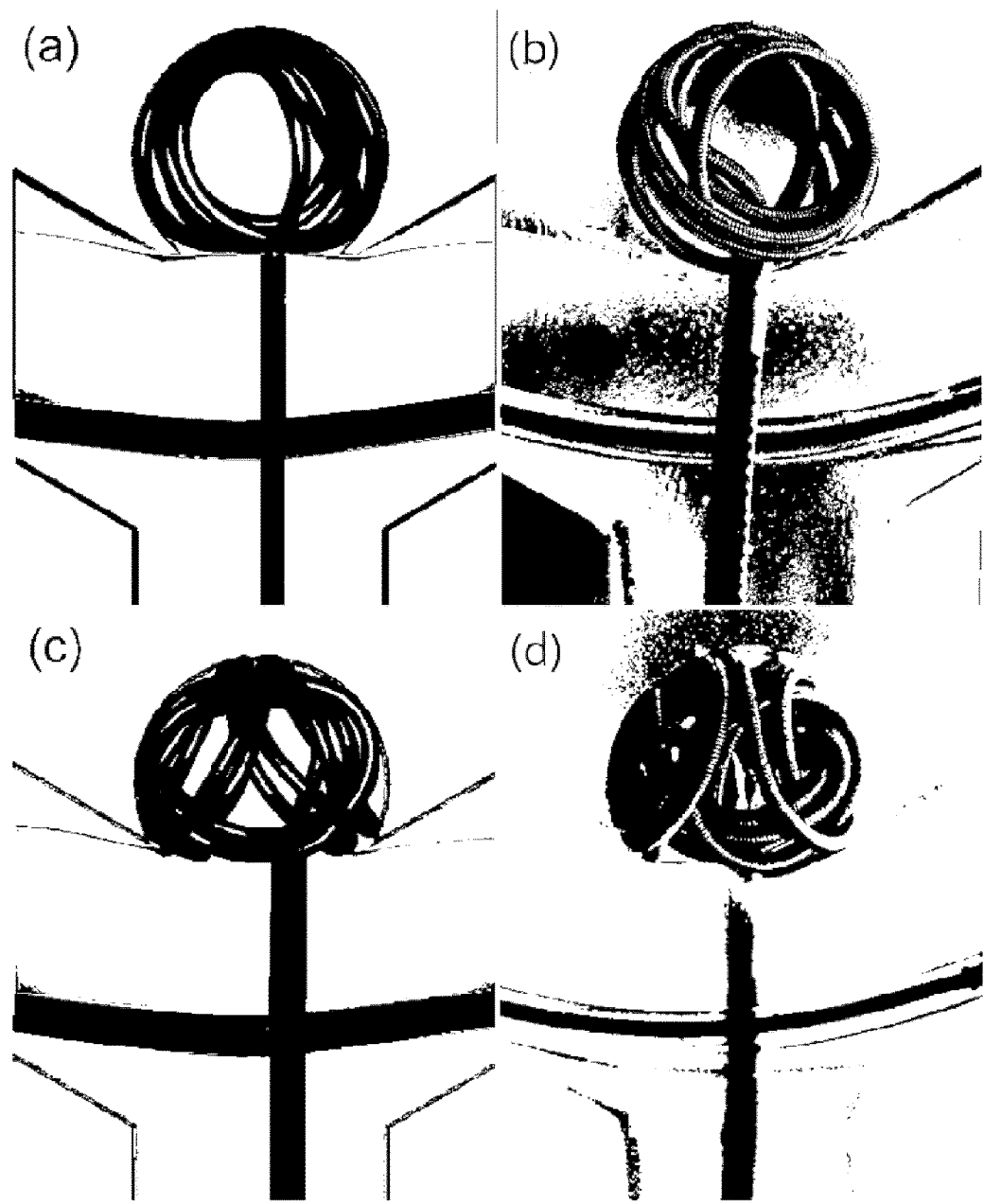
FIG. 6A-D

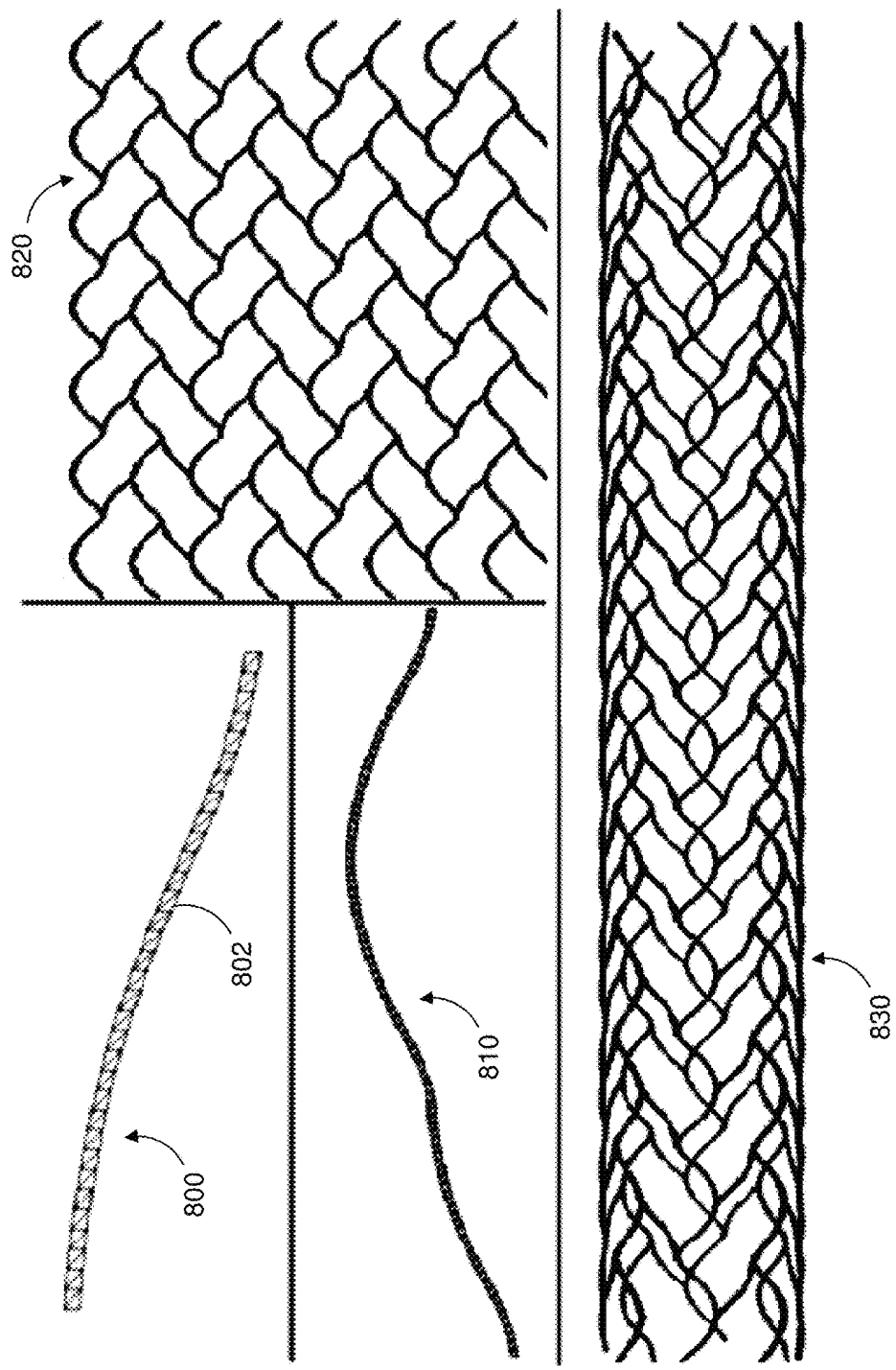

DEVICE SPECIFIC FINITE ELEMENT MODELS FOR SIMULATING ENDOVASCULAR TREATMENT

CROSS-REFERENCES TO RELATED APPLICATIONS

This application claims the benefit of U.S. Provisional application Ser. No. 61/996,972, filed May 22, 2014, entitled "DEVICE SPECIFIC FINITE ELEMENT MODELS FOR SIMULATING ENDOVASCULAR TREATMENT," and U.S. Provisional Application No. 61/996,971, filed Jan. 27, 2014, entitled "DEVICE SPECIFIC FINITE ELEMENT MODELS FOR SIMULATING ENDOVASCULAR TREATMENT." All of these applications are incorporated by reference in their entireties. Furthermore, any and all priority claims identified in the Application Data Sheet, or any correction thereto, are hereby incorporated by reference under 37 C.F.R. § 1.57.

STATEMENT REGARDING FEDERALLY SPONSORED RESEARCH

This invention was made with government support under Grant No. 1151232 awarded by the National Science Foundation. The U.S. government has certain rights in the invention.

BACKGROUND

Field

The present invention is generally related to medical device deployment simulations. The present invention more particularly relates to a system and method for simulating the endovascular deployment of a medical device and the hemodynamic outcomes of its placement.

Description of the Related Art

A cerebral aneurysm is a cerebral vascular disorder in which weakness of the wall of a cerebral artery or vein causes a localized dilation or ballooning of the blood vessel wall. Cerebral aneurysms are classified by both size and shape. Smaller aneurysms produce few, if any, symptoms. Larger aneurysms may cause severe headaches, nausea, vision impairment, vomiting and/or loss of consciousness. Larger aneurysms have greater tendency to rupture, but, the majority of ruptured aneurysms are small. About 50 percent of patients die immediately after rupture. In addition, ruptured cerebral aneurysms account for about 10 percent of all strokes.

For those 50 percent who survive, there are currently two conventional treatment options to stop the bleeding from a cerebral aneurysm as well as reduce the potential for recurrence: (1) surgical clipping; and (2) endovascular treatment. One or the other of these procedures must be performed within 24 hours of the rupture for optimal results. Surgical clipping involves removing the aneurysm at its base using a clip that is thereafter left to close the vessel wall. This procedure is currently done open, in the form of a craniotomy (i.e., cutting into the skull to access the brain), which carries with it significant risks.

Endovascular treatment involves the insertion of a medical device inside the aneurysm balloon or inside the affected blood vessel to prevent rebleeding. This procedure is performed intraluminally (i.e., from within the blood vessel and not requiring a cut into the skull) via the femoral or carotid artery and a microcatheter. Oftentimes, a stent, which is basically an expandable hollow bridge, is used to assist in deploying the coil into the aneurysm sac. The treatment works by promoting blood clotting around the coils, eventually sealing the aneurysm and reducing pressure on its outer wall.

Other endovascular treatments are being developed, including but not limited to flow diverter stents. Flow diverter stent devices block the opening at the base of the aneurysm (where it meets the vessel wall), preventing blood from flowing into the aneurysm sac.

It should be noted that endovascular treatments may be performed on patients who are diagnosed with cerebral aneurysms prior to rupture. Recent advances in medical imaging have increased early diagnosis of cerebral aneurysms by 75 percent, offering the promise of eradication of this silent killer.

Unfortunately, endovascular treatments carry risks. With respect to endovascular coiling, which is the most common type of endovascular treatment, recurrence rates related to post-procedure hemodynamics are as high as 50 percent relative to certain types of cerebral aneurysms. Also, intraoperative mortality occurs in 5-10 percent of the endovascular cerebral aneurysm treatment cases. As such, there is a need to improve these outcomes.

The medical simulation community has developed clinical training tools that simulate endovascular medical device placement. (See Cotin, et al., U.S. Application Publication No. U.S. 2008/0020362 A1.) These tools, however, construct a simplistic medical device model, ignore or simplify fluid dynamic simulations, do not construct an anatomical model from the patient's image data, and use a haptic device, which ultimately presents an unrealistic and unreliable post-treatment fluid dynamic prediction. (See also, simulation platforms produced by medical simulation companies known as Mentice, Simsuite and Simbionix). Others have invented a system and method for virtually designing a medical device conformed for use with a specific patient. (See Anderson, et al, U.S. Pat. No. 7,371,067 B2.) Such invention focused on virtually modeling a specific anatomic site and simulating the interaction between the anatomical model and a virtual medical device designed specifically for that patient.

The systems and methods disclosed herein seek to improve endovascular medical device placement procedure outcomes by taking into account the patient's clinical data and both the fluid dynamics of the post-procedure blood flow conditions and the structural dynamics of commercially available medical devices via simulation in order to ensure the most appropriate device(s) is/are ultimately used.

SUMMARY

The devices of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description," one will understand how the features of this invention provide several advantages over current designs.

An aspect of the present disclosure provides a system for simulating medical device dynamics. The system includes a database configured to store medical device models and one or more processors. The one or more processors are configured to virtually construct an anatomical structure model of a patient, simulate a deployment of a plurality of the medical device models in the anatomical structure model, and simulate hemodynamic outcomes of the deployment of the plurality of the medical device models in the anatomical structure model.

Another aspect of the present disclosure provides a method for simulating medical device dynamics. The method includes storing a computer readable database comprising medical device models, constructing, by the one or more processors, an anatomical structure model based on patient clinical data, simulating a deployment of a plurality of the medical device models in the anatomical structure model, and simulating hemodynamic outcomes of the deployment of the plurality of the medical device models in the anatomical structure model.

Another aspect of the present disclosure provides a method for simulating medical device dynamics. The method includes receiving, by one or more processors, an anatomical structure model for a patient, the anatomical structure model comprising one or more blood vessels and at least one flow rate within one or more of the blood vessels, receiving a selection of one or more medical device models from a collection of medical device models stored in a database, simulating, by the one or more processors, a deployment of the selected medical device models in the anatomical structure model, and simulating hemodynamic outcomes of the deployment.

Another aspect of the present disclosure provides a method of simulating navigation of a virtual medical device through a vessel. The method includes modeling, by one or more computers, advancing a crimped medical device disposed in a catheter along a centerline of a simulated blood vessel to a site of an aneurysm, and modeling, by the one or more computers, unsheathing the crimped medical device from the catheter at the site of the aneurysm.

Another aspect of the present disclosure provides a method of simulating navigation of a virtual medical device through a vessel. The method includes defining boundary conditions for navigation of a virtual medical device through a simulated blood vessel, defining loads to apply to the virtual medical device during the navigation, and applying the defined loads, in view of the defined boundary conditions, to the virtual medical device during navigation along a centerline of the simulated blood vessel to a site of an aneurysm.

An aspect of the present disclosure provides for a novel computational approach to planning the endovascular treatment of cardiovascular diseases. In particular, the invention simulates medical device deployment and hemodynamic outcomes using a virtual patient-specific anatomical model of the area to be treated, high-fidelity finite element medical device models and computational fluid dynamics (CFD). In an embodiment, the described approach investigates the effects of coil packing density, coil shape, aneurysmal neck size and parent vessel flow rate on aneurysmal hemodynamics.

Another aspect of the present disclosure provides a cloud-based high performance data processing system for simulating medical device dynamics. The data processing system includes a computer cluster having a user interface configured to receive patient clinical data. The patient clinical data may be used to virtually construct the relevant anatomical structure model. A server coupled to the computer cluster may have a database configured to store a plurality of medical device models. The medical device models may be constructed using finite element analysis and three dimensional beam analysis, and the user selects one or more medical device models from the database. The computer cluster may be further configured to simulate the deployment of the selected medical device(s) into the anatomical structure model, and the selected medical device model(s) and the anatomical structure model mesh. The computer cluster may be further configured to simulate hemodynamic outcomes using computational fluid dynamics.

Yet another aspect of the present disclosure provides a computerized method for simulating medical device dynamics that receives, by a computer cluster, patient clinical data. That patient clinical data may be used to virtually construct the relevant anatomical structure model. The method also stores a computer readable database configured to comprise a plurality of medical device models. The medical device models may be constructed using finite element analysis and three dimensional beam analysis. The user selects one or more medical device models from the database, and the computer cluster then simulates the deployment of the selected medical device(s) in the anatomical structure model, and the selected medical device model(s) and the anatomical structure model mesh. Finally, the method simulates hemodynamic outcomes using computational fluid dynamics.

In one implementation, the present disclosure provides a system for simulating medical device dynamics. The system may include a computer cluster having a user interface configured to receive clinical data of a patient, and a server coupled to the computer cluster. The clinical data may be used to virtually construct an anatomical structure model of the patient. The server may have a database configured to store a plurality of medical device models constructed using finite element analysis and three dimensional beam analysis, and the user may use the user interface to select one or more of the medical device models from the database. The computer cluster may be configured to simulate a deployment of each of the selected medical device models in the anatomical structure model such that the selected medical device models and the anatomical structure model mesh. The computer cluster may be further configured to use the meshing of the selected medical device models and the anatomical structure model to simulate hemodynamic outcomes of the deployment of the selected medical devices in the anatomical structure model using computational fluid dynamics.

The anatomical structure model may include one or more blood vessels, and may further include at least one flow rate within one or more of the blood vessels. The computer cluster may be configured to construct the plurality of medical device models. One or more of the medical device models may be an embolic coil, and each of the one or more embolic coils may be a complex coil or a helical coil. One or more of the medical device models may be a stent, and each of the one or more stents may be an enterprise stent, a Neuroform stent, or a flow diverter. The anatomical structure model may include a computational model, and each of the medical device models comprise one or both of a surface mesh and a CAD geometry. Simulating the deployment of each of the selected medical device models in the anatomical structure model may include generating one or more surface meshes and one or more blood volume meshes from the meshing of the selected medical device models and the anatomical structure model. The computer cluster may be configured to automatically simulate the deployment of a plurality of medical devices in the anatomical model.

In another implementation, the present disclosure provides a method for simulating medical device dynamics, the method steps being performed by a computer cluster. The method may include receiving patient clinical data used to construct an anatomical structure model, storing a computer readable database containing a plurality of medical device models each constructed using finite element analysis and three dimensional beam analysis, receiving a selection of one or more of the medical device models from the database, simulating a deployment of the selected medical device models in the anatomical structure model, and simulating hemodynamic outcomes of the deployment using computational fluid dynamics using one or more meshes of the selected medical device models and the anatomical structure model. Simulating the deployment may include creating the one or more meshes of the selected medical device models and the anatomical structure model. Each of the selected medical device models may be either an embolic coil or flow diverter comprising a plurality of beam elements or a high porosity stent comprising a repeating geometry of cells. The one or more meshes may include one or both of a surface mesh and a volume mesh.

When the selected medical device model is an embolic coil, creating the one or more meshes may include sweeping each of the beam elements using a circular surface of a first diameter to produce swept embolic coil surfaces, applying a mesh density function to the anatomical structure model and the coil surface mesh, defining one or more body parts representing blood volume and solid volume, and discretizing the body parts into the meshes. When the selected medical device model is a high porosity stent, creating the one or more meshes may include constructing a virtual topology of the stent surface, defining a maximum mesh element size and a minimum mesh element size for the cells applying a plurality of volume-mesh filling points to exclude overlapping regions from the geometry, generating a volume mesh encompassing the stent and comprising one or more layers including an outermost layer, generating a surface mesh by projecting the outermost layer of the volume mesh onto the stent surface, converting the surface mesh into a facet geometry, applying a mesh density function to a blood volume within the anatomical structure model near the facet geometry, defining one or more body parts representing blood volume and solid volume, and discretizing the body parts into the meshes.

In another implementation, the present disclosure provides another method for simulating medical device dynamics, the method steps being performed by a computer cluster. The method may include receiving an anatomical structure model for a patient including one or more blood vessels and at least one flow rate within one or more of the blood vessels receiving a selection of one or more medical device models from a collection of medical device models stored in a database, simulating a deployment of the selected medical device models in the anatomical structure model, and simulating hemodynamic outcomes of the deployment. Simulating the deployment may include connecting the selected medical device model to a microcatheter model and advancing the microcatheter model into the anatomical structure model. Simulating the deployment may include modeling contacts between the selected medical device model and the anatomical structure model with a penalty contact enforcement algorithm. The method may further include creating one or more of the medical device models in the collection of medical device models.

Further aspects, features and advantages of the present invention will become apparent from the detailed description that follows.

BRIEF DESCRIPTION OF THE DRAWINGS

These and other features, aspects, and advantages of the present invention will now be described in connection with embodiments of the present invention, in reference to the accompanying drawings. The illustrated embodiments, however, are merely examples and are not intended to limit the invention. Some embodiments will be described in conjunction with the appended drawings, where like designations denote like elements.

Embodiments of the invention will now be described, by way of example only, with reference to the accompanying drawings in which corresponding reference symbols indicate corresponding parts.

FIGS. 6A-D are diagrams of exemplary finite element coil deployment validations against physical coil deployments.

FIG. 8 is a multiple-step diagram of the construction of a stent having the design of FIG. 7B.

Figure 1:
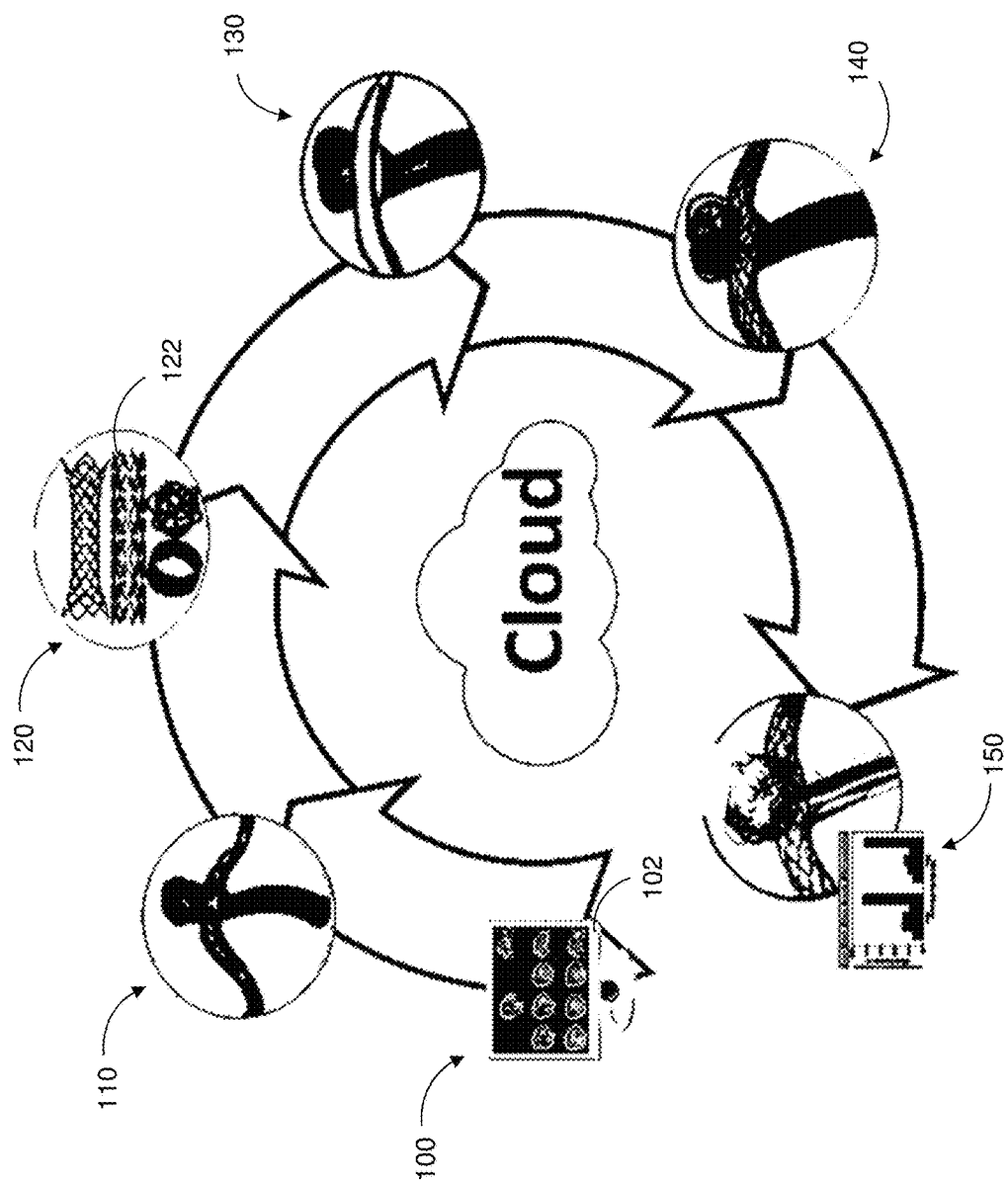
FIG. 1 is a flowchart of a treatment planning method in accordance with the present disclosure.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 depicts an overview of the present treatment planning system. The system can be performed by a computer, computer cluster, processor, or server as described herein. The system implements a method of planning a medical treatment for a patient in which: at step 100, a user of the system enters patient data at a workstation 102; at step 110, the patient data is uploaded to a system server, where it is used to construct a model of the relevant anatomical structure; at step 120, the user selects the medical devices 122 he/she wishes to have deployed in a virtual model of the patient; at step 130, device deployment is simulated according to a design treatment; and, at step 140, the virtual patient's hemodynamic outcome is simulated as described below. The method may be employed by one or more software modules executed by a processor. In certain embodiments, the system steps are repeated with the user varying the medical devices selected. However, the system may also automatically simulate different medical devices and/or different sizes of a medical device. For example, several different sizes of complex coils may be successfully deployed into an aneurysm sac, but with varying results; the system may receive an indication (e.g., from a physician) that a particular complex coil is the desired treatment, and may automatically simulate deployment, according to the methods below, of a plurality of sizes of the selected complex coil and may provide (e.g., within the report of step 150) a recommendation for the appropriate size of coil. In some embodiments, the system may select the different devices or different device sizes without input from the user. Once all desired simulations are complete, at step 150 the system may provide a report comparing the hemodynamic outcomes and medical device performance of each alternative treatment combination.

Simulating Endovascular Device Deployment

In the past, finite element (FE) analysis was used to aid in the design and optimization of medical devices during manufacture. Its use to simulate device dynamics during deployment has been significantly limited, however, due to several technical challenges. These challenges include, but are not limited to, complex geometries, non-linear deformations and numerous contact interactions. This invention proposes novel FE approaches for overcoming the technical barriers associated with simulating endovascular device deployment. The developed FE approaches consider the structural properties, design specifications and deployment mechanics of endovascular devices.

Modeling Embolic Coils

Figure 2C:
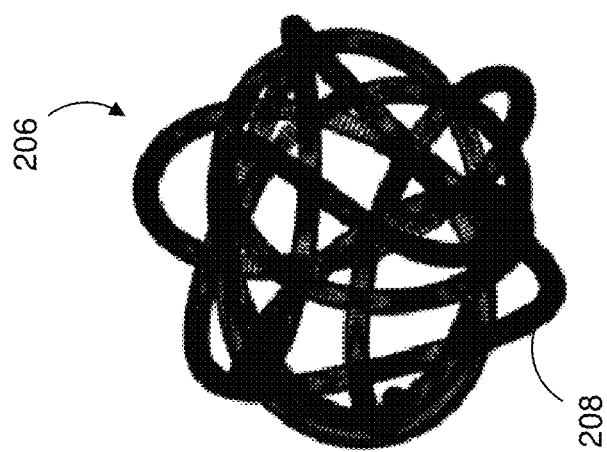
FIGS. 2A-C are diagrams of exemplary structures for endovascular coils.
Figure 2B:
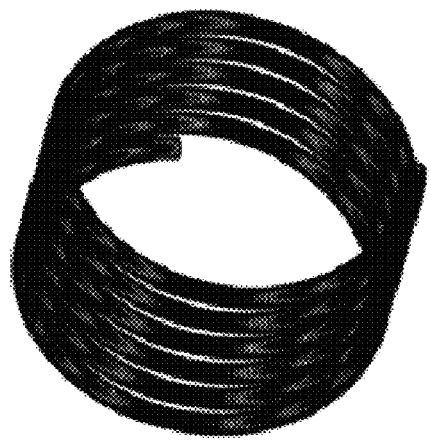
Figure 2A:
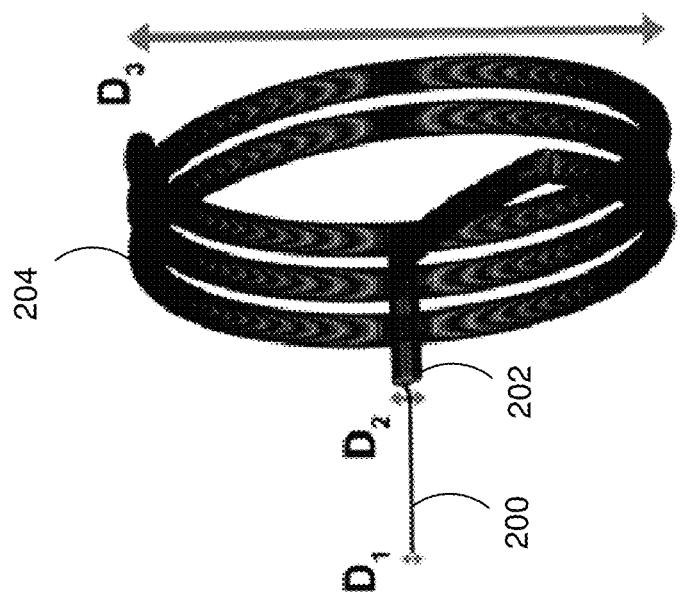

As shown in FIG. 2A, embolic coils may be constructed from a thin metal wire 200, with diameter ($D_1$), which is wound into a secondary helical structure 202 with diameter ($D_2$). The helical structure 202 is then shaped into a tertiary structural configuration 204 having a specific coil loop diameter ($D_3$). Coils may have many different tertiary structures or "shapes." The two most common coil shapes are helical (FIG. 2B) and complex (FIG. 2C). Referring to FIG. 2C, complex coils 206 are spherical, "yarn-like" structures in which each coil loop 208 is aligned at a different angle. Coil shape and size (determined by diameter $D_3$) influence aneurysmal filling and coil distribution in the sac, while the thickness of the metal wire (diameter $D_1$) and the diameter D2 of the helical wind determine coil stiffness.

FE Coil Model

Figure 3A:
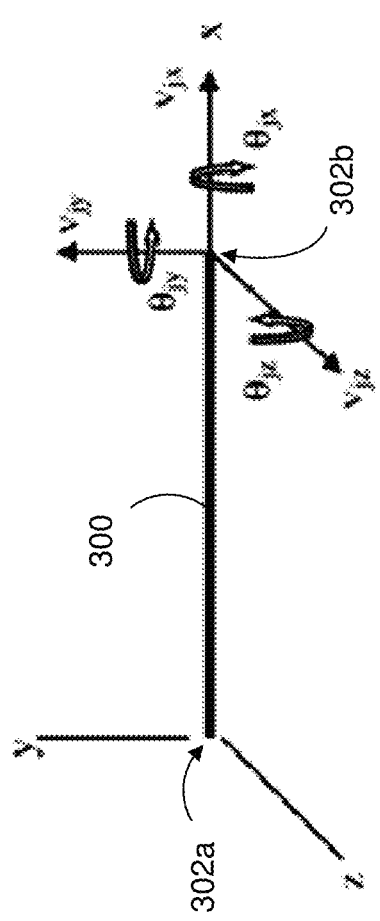
FIG. 3A-B are graphs demonstrating serial linkage of beam elements using three-dimensional beam theory.
Figure 3B:
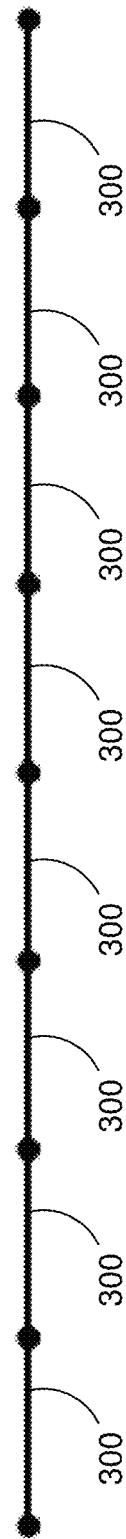

In a FE coil model, embolic coils may be modeled using three dimensional (3D) beam theory. Referring to FIGS. 3A-B, each coil may be represented by a set of serially linked 3D beam elements 300, where each beam is composed of two or three nodes 302a, 302b that connect to adjacent elements 300. The element 300 may have up to six degrees of freedom at each node 302a, 302b, as shown by axial rotations $\theta_{jy}$, $\theta_{jx}$, and $\theta_{jz}$ around orthogonal vectors $v_{jy}$, $v_{jx}$, and $v_{jz}$, respectively. Ninety-two percent platinum and eight percent tungsten material compositions were specified for the coils, which resulted in a Young's modulus of 7.5 GPa and a density of 21.3 g/cm3. A Poisson ratio of 0.39 was also prescribed, following the assumption that the stock metal wire of the coil was tightly wound and can be approximated as a hollow beam element with a thickness equivalent to the coil filament diameter and primarily made of platinum. The coils may be virtually placed in a 0.4 mm diameter rigid catheter or microcatheter and digitally discretized with a mesh resolution of 1.5×$D_2$. Finer mesh resolutions may be used, but may result in considerable overclosure between adjacent coil loops.

Any suitable approach may be used to model coil memory shape. In one embodiment, the coil memory shape may be modeled using an external force-based approach; alternatively or additionally, for example, an elastic strain energy-based approach may be used. In the external force-based approach, concentrated load forces may be exerted onto the beam element nodes to specify coil shape and loop size. The concentrated nodal loads may be applied, at a constant magnitude, throughout the simulation to force the coil into a specific configuration. In the elastic strain energy-based approach, the coil shape may be modeled by applying initial stresses and strains onto the beam element nodes. The initial stresses and strains impart internal elastic forces onto the beam elements until the coil reaches its lowest strain energy point.

Figure 4:
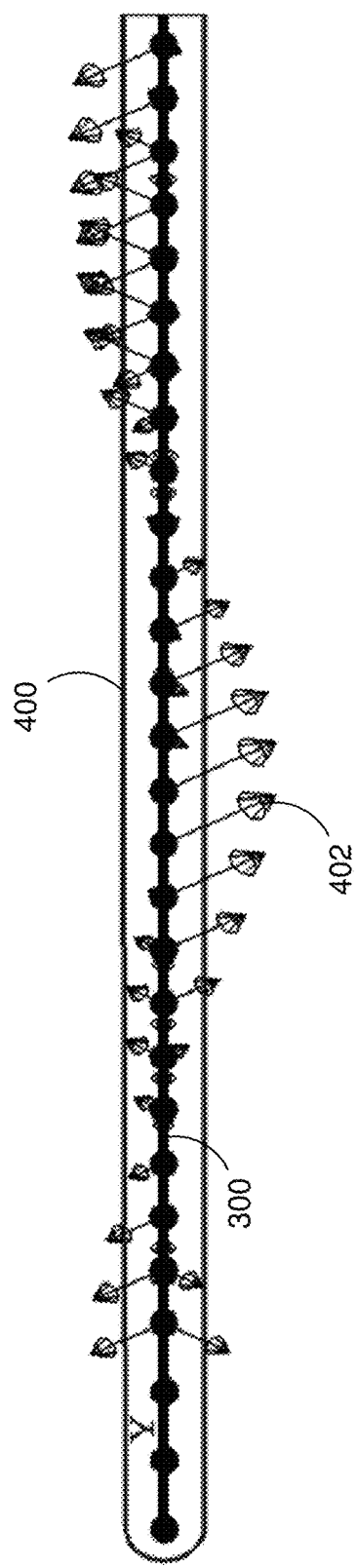
FIG. 4 is a graph of an external force-based approach to modeling coil memory shape.

More particularly, in the force-based approach, parametric equations may be applied through a subroutine to specify coil shape and loop size. Referring to FIG. 4, the interconnected beam elements 300 may be modeled within a catheter, sheath enclosure, or microcatheter 400, and concentrated load forces 402 may be exerted on the beam element 300 nodes (e.g., 302a) in each Cartesian direction X, Y, Z (it will be understood that the arrows representing the load forces 400 may be pointing in any 3D direction) according to the parametric equations. The parametric equations were derived by estimating the force $F_{mag}$ required to displace a beam element by $D_3/2$ using the equation:

$$F_{mag}=[K_e]U$$

where $[K_e]$ is the stiffness matrix of the beam element and U is the vector of displacements. $F_{mag}$ may then be multiplied by the force distribution or shape of the coil (i.e., the scaling and direction of the force). Two different force distributions have been investigated: a complex or spherical distribution and a helical distribution, each illustrated further below. The complex distribution was modeled as a 3D curve with multiple helical loops rotated around a sphere at different angles, which is similar to the described geometry of physical complex coils. The helical distribution was modeled as helical loops perpendicular to the main axis of the straight set of beam elements, which is similar to the geometry of helical coils.

Figure 5:
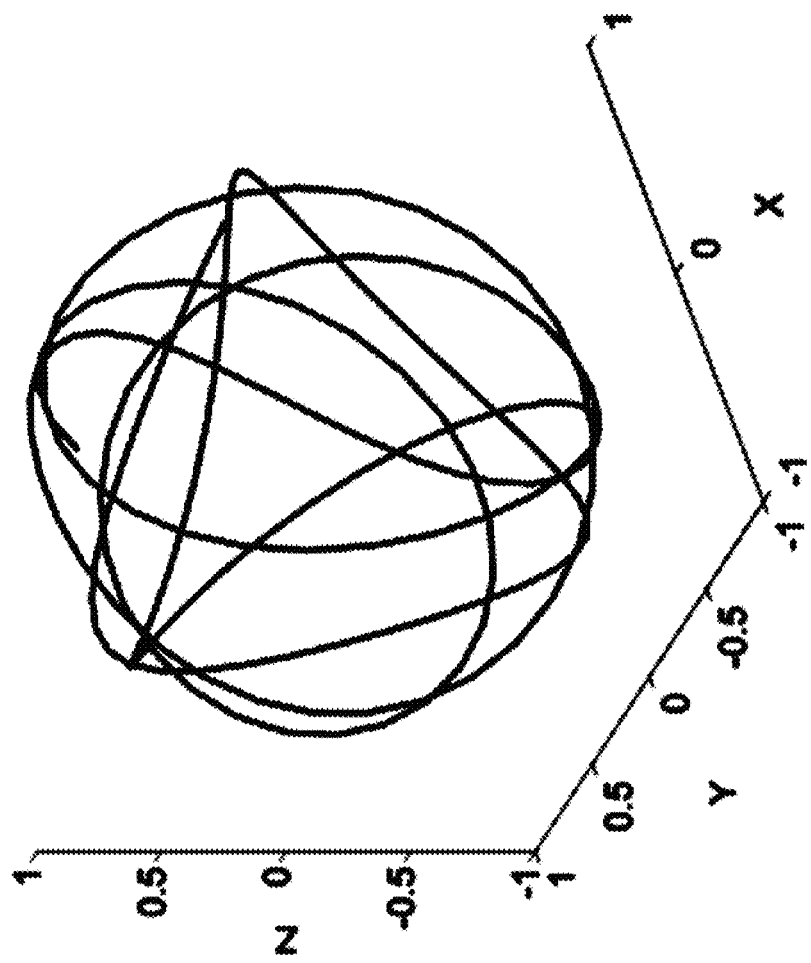
FIG. 5 is a graph of an exemplary computational geometry of a complex (spherical) shaped coil for modeling coil memory shape.

An embodiment of a complex shape force distribution is illustrated in FIG. 5 and referred to herein by its parametric equation $C_{shape}$. $C_{shape}$ may be constructed by taking a point P describing a circle on a sphere and rotating it along the x ($R_x$), y ($R_y$), then z ($R_z$) axis at different rotation angles ($\gamma$, $\beta$, and $\alpha$).

$$P=(\cos(\theta),\sin(\theta),0)$$

$$f_1=R_x(P;\gamma)$$

$$f_2=R_y(f_1,\beta)$$

$$C_{shape}=R_z(f_2,\alpha)$$

Different rotation angles were selected for each axis and rotation angles were varied linearly along the main axis of the wire (positions $Z_i$).

$$\theta = Z_i * \lambda$$

$$\gamma = Z_i * \lambda/\pi$$

$$\beta = Z_i * \lambda/\pi^2$$

$$\alpha = Z_i * \lambda/\pi^3$$

The above equation for $C_{shape}$ results in a parametric function that is given by:

$$C_{shape} = [C_{shape}\text{-}x, C_{shape}\text{-}y, C_{shape}\text{-}z];$$

which expands into:

$$C_{shape}\text{-}x = \cos(\gamma)*(\sin(\beta)*(\sin(\gamma)*\sin(\theta)) + \cos(\beta)*\cos(\theta)) - \sin(\alpha)*(\cos(\gamma)*\sin(\theta))$$

$$C_{shape}\text{-}y = \sin(\alpha)*(\sin(\beta)*(\sin(\gamma)*\sin(\theta)) + \cos(\beta)*\cos(\theta)) + \cos(\alpha)*(\cos(\gamma)*\sin(\theta))$$

$$C_{shape}\text{-}z = \cos(\beta)*(\sin(\gamma)*\sin(\theta)) - \sin(\beta)*\cos(\theta).$$

In the illustrated embodiment, loop diameter $D_3$ may be prescribed using:

$$\lambda = 1.7601 * D_3^{-1.028}$$

which presents the relationship between $\lambda$ and the loop diameter $D_3$. The relationship is determined by first calculating the mean circumference of all the loops in $C_{shape}$ for a given value of $\lambda$. $D_3$ may then be calculated from the mean circumference and plotted against $\lambda$. An exponential curve according to the equation above for $\lambda$ may thus be used to fit the data.

A helical force distribution may be modeled after helical coils, which when deployed can form helical loops perpendicular to the catheter, sheath enclosure, or microcatheter 400 axis. Accordingly, a parametric equation, $H_{shape}$, may represent the geometry of a helix perpendicular to the main axis of the straight wire. Coil loop diameter ($D_3$) may be specified by defining the number of turns N in the helix. N is given by:

$$N = L/(\pi D_3)$$

where L is the length of the wire divided by the circumference of each loop (assuming negligible vertical separation between loops). The equation of a helix in the Y and Z axes can be represented by $$Y = \cos(2\pi N)$$

$$Z = \sin(2\pi N)$$

Substituting the equation for N leads to the parametric equation for $H_{shape}$:

$$H_{shapeY} = \cos(2/(D_3 * Z_i))$$

$$H_{shapeZ} = \sin(2/(D_3 * Z_i)).$$

Note that $H_{shape}$ is defined only for the Y and Z axis. Where no force is applied in the X axis, the vertical distance between the loops may be determined by the helical wind diameter ($D_2$).

In the strain-based approach, initial stresses and strains are applied to beam elements 300 placed in the catheter 400. The imposed strains and stresses impart elastic energy onto the structure which is given by:

$$E = \Sigma \int_{Ve} \sigma^T \epsilon \, dV$$

where $\sigma$ and $\epsilon$ are defined below. During simulation, the internal elastic forces drive the coil back to its original configuration.

The initial stresses and strains may be defined by first creating the geometry of the deployed coil in air. Coil geometries may be constructed by multiplying loop diameter and coil shape (i.e., $D_3 C_{shape}$ and $D_3 H_{shape}$). Material orientations may be defined to align the strain components with the coil geometry's local orientation. The coil may then stretched into a straight wire. The generated stresses and strains may then be applied to the series of beam elements 300 in the microcatheter 400.

Solving Equations of Motion

The dynamic equation of motion of a structure can be written as:

$$[M]\ddot{u} + [C]\dot{u} + [K]u = F_{ext}$$

where [M], [C] and [K] are the mass, dampening and stiffness matrices of the structure. $F_{ext}$ is the vector of external load and u, $\dot{u}$ and $\ddot{u}$ are the displacement, velocity, and acceleration vectors. The equation can be solved using direct integration numerical schemes. There are many different integration schemes that can be used. Due to the complex contact interactions involved in simulating device deployment, an embodiment of an explicit integration scheme may be used. The scheme performs well in highly non-linear, dynamic problems that involve multiple contact interactions. Further, it represents a straight forward approach to solving complex non-linear systems, wherein a solution is marched forward in time without solving a system of coupled equations at each time increment. The solution for this embodiment is calculated by first determining accelerations within the system, using the governing equation:

$$\ddot{u}^{(i)} = M^{-1}(F_{ext}^{(i)} - I_{int}^{(i)})$$

where $\ddot{u}^{(i)}$ is the acceleration at current time i, M is the mass matrix, and $F_{ext}$ and $I_{int}$ are the vectors of external and internal nodal forces, respectively. The computation of this equation is inexpensive as M is a diagonal matrix consisting of lumped masses at the nodes of each beam element.

Next, $\ddot{u}^{(i)}$ is used to calculate the velocity $\dot{u}$ and displacement u at later time increments.

$$\dot{u}^{(i+\frac{1}{2})} = \dot{u}^{i-\frac{1}{2}} + \frac{\Delta t^{(i+1)} + \Delta t^{(i)}}{2} \ddot{u}^{(i)}$$

$$u^{(i+1)} = u^{(i)} + \Delta t^{(i+1)} \dot{u}^{(i+\frac{1}{2})}$$

The explicit scheme is non-iterative and is therefore associated with low computational cost per time increment. However, the explicit scheme is conditionally stable, requiring a very small time-step to stabilize the solution. The stability limit of the explicit scheme is determined by the highest eigenvalue in the system $\omega_{max}$.

$$\Delta t_c < (2/\omega_{max})$$

The limit can also be expressed as the time it takes for information to travel between adjacent nodes using the equation:

$$\Delta t_c = \min(L^e/c^d)$$

where $L^e$ is the characteristic element length and $c^d$ is the dilational wave speed, which is governed by the elastodynamic equations of motion:

$$c^d = \sqrt{\frac{\lambda + 2\mu}{\rho}}$$

where $\lambda$ and $\mu$ are elastic constants and $\rho$ is the material density.

The vector of displacements u at increment i+1 is then used to calculate the elemental strains $\epsilon$ using the equation:

$$\epsilon = \int \frac{u_{node1} - u_{node2}}{L_e}$$

Stresses in the system $\sigma$ are calculated as a function of strain:

$$\sigma(t+\Delta t) = f(\sigma t, \Delta \epsilon)$$

For a linear elastic material, the relationship between stress and strain is governed by the equation:

$$\sigma = [D]\epsilon$$

where [D] is the elasticity matrix. This equation can also be written in matrix form as:

$$\begin{vmatrix} \sigma_x \\ \sigma_y \\ \sigma_z \\ T_{xy} \\ T_{yz} \\ T_{xz} \end{vmatrix} = \begin{bmatrix} 2\mu+\lambda & \lambda & \lambda & 0 & 0 & 0 \\ \lambda & 2\mu+\lambda & \lambda & 0 & 0 & 0 \\ \lambda & \lambda & 2\mu+\lambda & 0 & 0 & 0 \\ 0 & 0 & 0 & \mu & 0 & 0 \\ 0 & 0 & 0 & 0 & \mu & 0 \\ 0 & 0 & 0 & 0 & 0 & \mu \end{bmatrix} \begin{vmatrix} \varepsilon_x \\ \varepsilon_y \\ \varepsilon_z \\ \gamma_{xy} \\ \gamma_{yz} \\ \gamma_{xz} \end{vmatrix}$$

The internal nodal forces $I_e$ at t+$\Delta$t may then be assembled using the value of $\sigma$ at t:

$$I_e = \int_{Ve} [B]^T \sigma_{t+\Delta t} dV$$

where [B] is the strain displacement matrix, which contains the second derivative of the shape function of each element.

$$[B] = \frac{d^2}{dx^2} N = [N_1^*(x) N_2^*(x) N_3^*(x) N_4^*(x)]$$

In the case of beam elements, the shape function is given by:

$$N_1 = \left[1 - 3\left(\frac{x^2}{L}\right) + 2\left(\frac{x}{L}\right)^3\right]$$

$$N_2 = \left[1 - \left(\frac{x}{L}\right)\right]^2$$

$$N_3 = 3\left(\frac{x}{L}\right)^2 - 2\left(\frac{x}{L}\right)^3$$

$$N_4 = x\left[\left(\frac{x}{L}\right)^2 - \left(\frac{x}{L}\right)\right]$$

where x represents nodal coordinates.

Modeling Contacts

A penalty contact enforcement algorithm may be used to model contact interactions during device deployment. The algorithm is better suited for contacts involving rigid bodies and node elements, and provides less stringent constraints than kinematic contact models. It is based on a master/slave formulation, where the slave surface is subordinate to the master surface. Contact is detected when the slave surface nodes penetrate the master surface's facets. Penetration is resolved by calculating the spring "stiffness" or resisting force required to oppose penetration. The force is calculated using the depth of the slave node's penetration, its mass, and the time increment. Combinations of penalty and kinematic contacts may also be used to model contact interactions during device deployment.

A finite sliding formulation may be used to define the type of contact allowed. The formulation allows arbitrary separation, sliding, and rotation of the surfaces during contact. However, the formulation assumes that the tangential motion between surfaces does not exceed the facet size of the master surface within one time increment. This assumption complies with the explicit scheme used because of its small time increments. The finite-sliding formulation also assumes that the master surface has continuous surface normals at all points. If the master surface normals are discontinuous, then slave nodes may become confined in certain regions. Therefore, the master surface is smoothed to remove any sharp transitions in geometry.

A contact tracking algorithm may be used to track the minimum distance between the master surface and each slave node at each increment during simulation. The tracking algorithm may be divided into a global and a local contact search component. The global search is the most computationally expensive component of the tracking algorithm and is responsible for finding the nearest master surface facet for each slave node. To reduce computational cost, a bucket sorting algorithm may be used. The computational cost may be further reduced by implementing the global search once every 100 increments. A local search may be performed in subsequent increments until the next global search. The local search only tracks master surface facets that were previously tracked in the last increment.

When the master and slave surfaces are in contact, a friction model may be used to determine whether the slave node slips or sticks. The frictional model follows Coulomb's friction law, which states that the tangential motion is limited by the product of the frictional coefficient $\mu$ and the normal traction $t_N$.

$$|t_t| < \mu |t_N|$$

Nodes that fulfill this equation stick to the surface, while nodes that do not fulfill the equation slide along the surface with $$|t_t| = \mu |t_N|.$$

In an embodiment of virtually deploying the coils, a displacement boundary condition may be prescribed at the distal node to guide the coil into the sac, which simulates the clinical coil pusher used in vivo. A penalty contact enforcement algorithm may be used to model self, coil-to-coil, coil-to-catheter, and coil-to-aneurysm interactions. Coil-to-catheter interactions were assumed to be frictionless to account for catheter lubrication. Frictional coefficients of 0.4 and 0.2 were prescribed for the coil-to-aneurysm and coil-to-coil interactions, respectively.

Finite element coil deployments were rigorously validated against in vitro and in vivo deployments. One such validation is shown in FIG. 6, where simulated finite element deployments (boxes (a) and (c)) are compared against in vitro helical and complex coil deployments (boxes (b) and (d)) in identical aneurysm models.

Modeling Stents and Flow Diverters

Figure 7A:
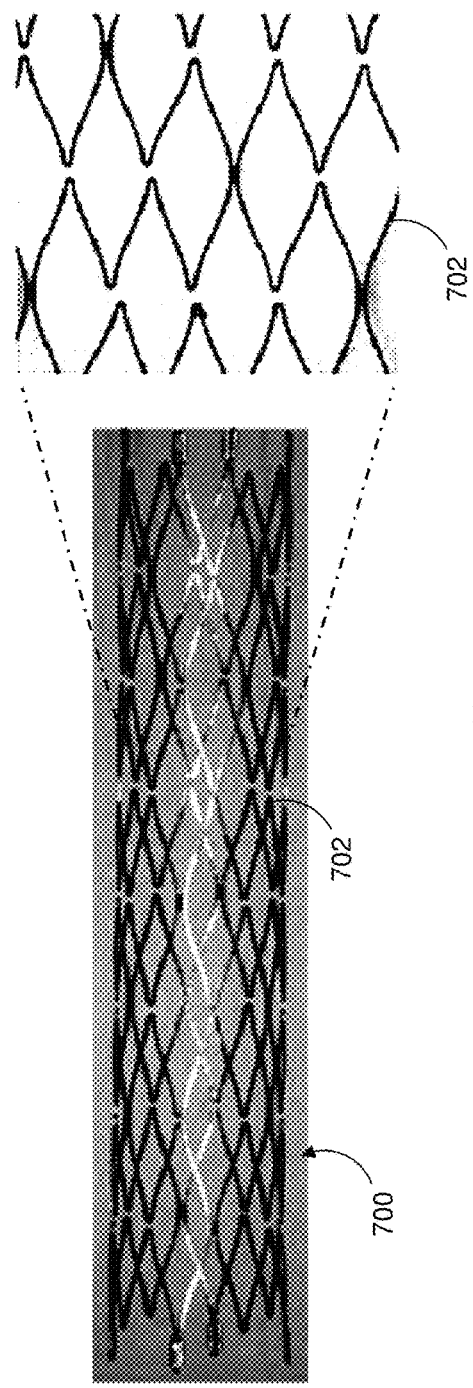
FIGS. 7A-B are diagrams of exemplary high-porosity stent designs.
Figure 7B:
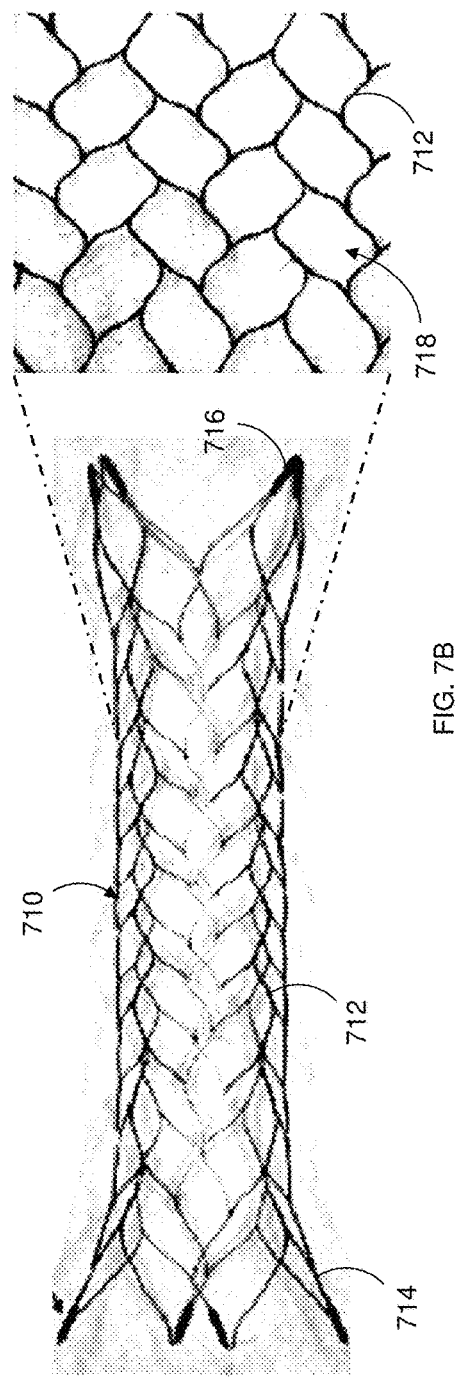

While the present invention may be used to effectively model any suitable porous stent, two embodiments of high porosity stents are described herein by way of example: (1) a Neuroform stent; and (2) an Enterprise stent. Both stents are composed of Nitinol, a Nickel-Titanium alloy, and have an estimated porosity of 90%. However, the stents differ in design, as shown in FIGS. 7A-B. The Neuroform stent 700 features an open cell design and consists of eight sinusoidal crown segments. The open cell design of the Neuroform stent 700 enhances its flexibility in tortuous vessels and provides it with a high radial force, which translates to better vessel conformability at acute angle bends. Each Neuroform stent 700 strut 702 has an estimated thickness of about 70 μm.

The Enterprise stent 710 features a closed cell 712 design with flared ends 714, 716. Advantages of the closed cell design include smaller pore 718 sizes, which translate to better coverage of the aneurysm neck, and reduced risk of stent protrusion into the aneurysm during deployment, which is a common unfavorable deployment outcome for open cell designs. However, stents with closed cell designs typically have a lower radial force (among stents with the same strut thickness) and poorer conformability to the vessel wall at acute angle bends. Each Enterprise stent 710 strut 720 has an estimated thickness of about 90 μm.

Flow diverters are stent-like devices that are deployed across the aneurysmal orifice in order to divert blood away from the aneurysmal sac. They are commonly self-expandable devices with low stent porosity and feature braided tubular structures. One example of a flow diverter is the pipeline embolization device (PED), which is composed of 48 braided cobalt-chromium alloy strands. Each strand is approximately 30 microns in diameter. The stent porosity of the PED varies from 65-70% depending on device configuration and the diameter size of the artery.

Modeling Stent and Flow Diverter Geometry

In an modeling example according to the illustrations, both the Neuroform and Enterprise high porosity stents were constructed in Pyformex (pyformex.berlios.de) using a custom built python code. It will be understood that other programming languages may be equally suitable for the stent modeling. Referring to FIG. 8, construction of stent geometries involves: (i) creating a planar base model 800 of a repeating cell geometry using triangular elements 802, (ii) reflecting and replicating the geometry to create a 2D version 810 of the stent, and (iii) applying a cylindrical transformation to "roll" a 2D geometry 820 into a cylinder 830.

In the case of the Enterprise stent, illustrated in FIG. 8, a Gompertz function was first used to construct the base geometry. The function is given by $$y(x)=ae^{be^{cx}}$$

where x is the position and a, b, and c are coefficient values that were determined using high resolution images of the Enterprise device. The resulting triangular meshes were written as stereolithography (STL) files and imported to Geomagic Studio to rectify any intersecting or overlapping triangular elements. The STL files were then converted to CAD geometries and imported into Abaqus, a finite element solver.

In the case of the PED, 3D beam theory was used, in a manner similar to that described above for modeling coil geometry, to model individual strands of the PED. Specifically, each PED strand was represented by a set of serially linked elastic solid 3D beam elements, as illustrated in FIG. 3A-B, with 30 micron diameter. The strands were braided using a custom built mathematical description of the braiding scheme, which specifies the pitch (angle between separate strands), number of clockwise and anti-clockwise strands, diameter and length of the PED, and the diameter of the strands. Cobalt-Chromium alloy material properties were imposed onto the beam elements.

The stent and flow diverter geometries were meshed in Abaqus using triangular and quadrilateral shell elements. Approximately 6,000-8,000 reduced-order triangular shell elements were generated for each stent geometry. An artificial shell thickness of 70 μm was applied to all the shell elements and hyperelastic material properties were imposed. The hyperelastic material properties approximate Nitinol's austenite and martensite material phases at body temperature.

Modeling Stent and Flow Diverter Deployment

Figure 9:
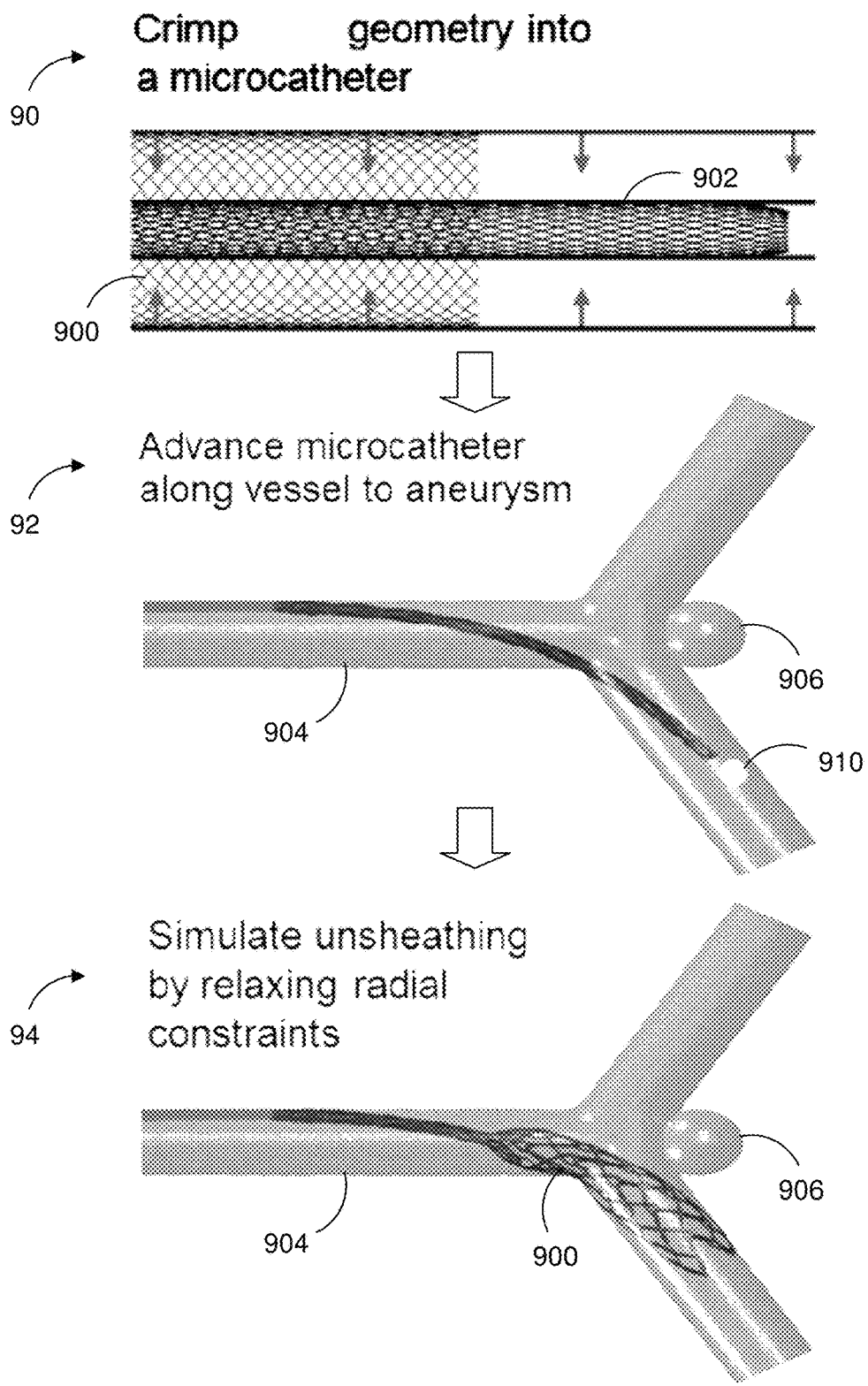
FIG. 9 is a flowchart of a method of modeling a virtual stent deployment.

FIG. 9 depicts an example three-step simulated deployment of a virtual stent or flow diverter, performed by a computer, computer cluster, or server as described herein. Generally, this process involves: at step 90, "sheathing," or crimping the geometry 900 of the stent or flow diverter into the shape of a catheter, sheath enclosure, or microcatheter 902; at step 92, advancing the catheter 902 through a simulated blood vessel 904 to the site of the aneurysm 906; and, at step 94, unsheathing the geometry 900 by relaxing the radial constraints applied at step 90 on all or a portion of the geometry 900 in a step-by-step process. In an embodiment, crimping (step 90) may be performed by imposing a radial displacement boundary condition (i.e., a "crimper") onto a cylindrical shell. In one application, the crimper may compress the geometry 900 into a 0.54 mm catheter 902. The magnitude of the radial displacement is applied in time using a smooth step function to reduce chatter vibration between the geometry 900 and crimper.

Figure 10:
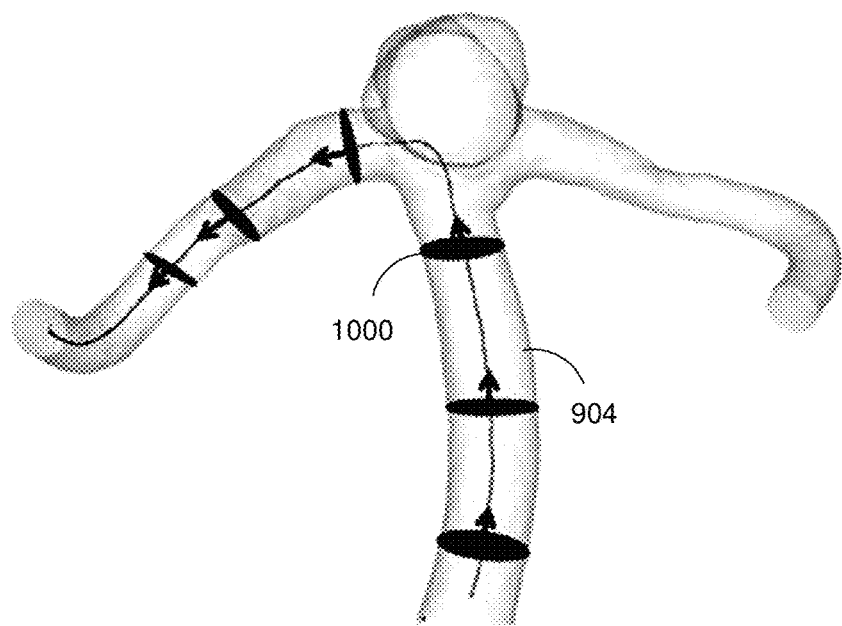
FIG. 10 is a diagram of a virtual catheter navigation based on the vessel centerline.

After crimping, the catheter 902 is advanced along the vessel 904 centerline to the site of the aneurysm 906, which site is shown in greater detail in FIG. 10. In one application, catheter 902 advancement may be performed through kinematic coupling between a reference point 910 (see FIG. 9), which models a guidewire, and nodes at the catheter 902 tip. Displacements and direction normals are calculated using the vessel centerline and then prescribed onto the reference point 910. In another embodiment the reference point 910 may also be coupled to the nodes at the tip of the stent or flow diverter.

Figure 11:
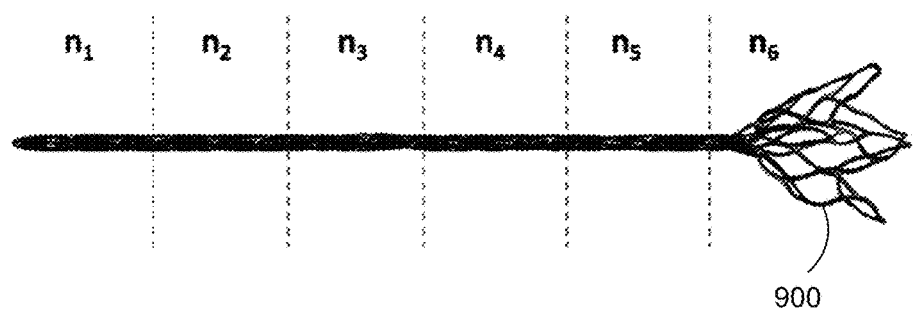
FIG. 11 is a diagram of an application of radial boundary constraints and constraint relaxation for a virtual stent during deployment.

Referring to FIG. 11, after catheter 902 advancement, the geometry 900 may be divided into multiple subsets $n_{1-6}$, and radial constraints may be applied to each subset to constrain the stent/flow diverter radius to the catheter radius, as given by:

$$r_{stent}-n_i=r_{catheter}.$$

To unsheathe the geometry 900 (step 94), step-by-step the radial constraints on each geometry subset $n_{1-6}$ may be relaxed, such as in reverse sequence (i.e., beginning at the tip of the geometry 900). A different unsheathing simulation process can be performed by advancing a pusher (a component of the stent delivery system) to push the stent/flow diverter outside the catheter while slowly pulling back the catheter to simulate stent/flow diverter unsheathing.

Meshing

Meshing of the simulated geometry may be performed to provide computational data for determining the hemodynamics of the implant. In the below-described example implementation of a meshing approach, a computational model of the untreated cerebral aneurysm, and a stereolithography model of the endovascular device geometry were imported into ANSYS ICEM 12.1 software (ANSYS, Inc., Canonsburg, Pa., USA) to generate surface and volume meshes.

Meshing Embolic Coils

Figure 12A:
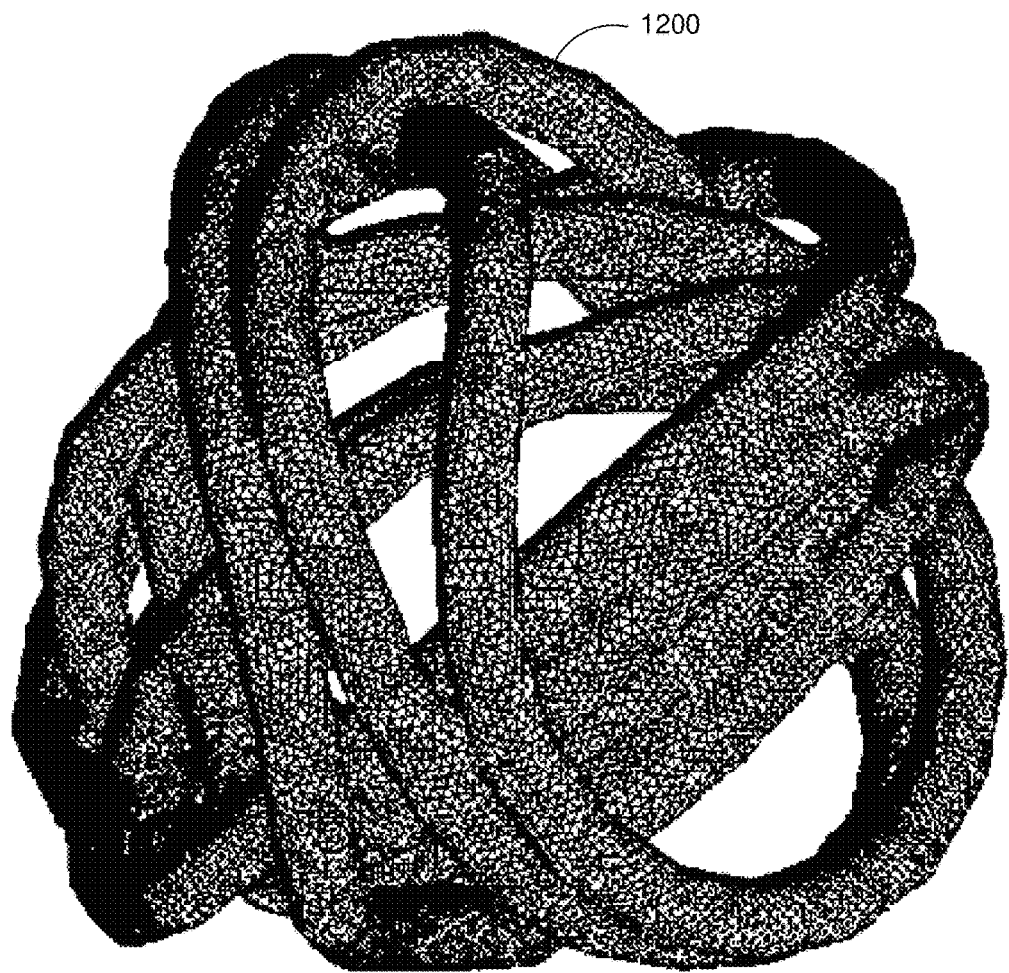
FIG. 12A is a diagram of a surface mesh of a single endovascular coil.
Figure 12B:
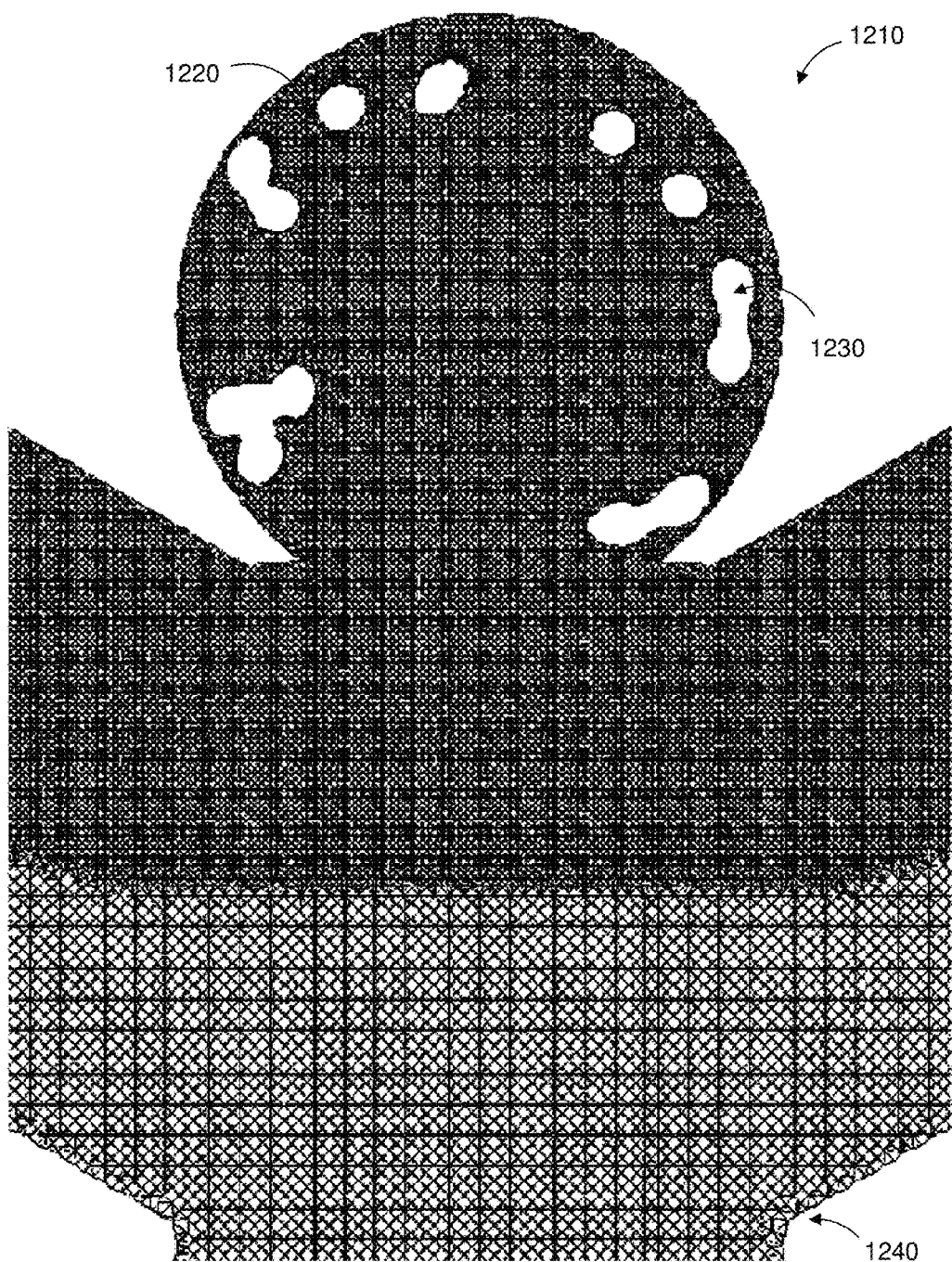
FIG. 12B is a diagram of a cross-section of a volume mesh representing blood volume in a coiled basilar-tip aneurysm.

Beam elements were first swept in Matlab using a custom built code. The beam elements were swept using a circular surface with a diameter $D_2$. The swept embolic coil surfaces were then shrink-wrapped with a maximum triangular mesh element size of 20 μm to merge different coils and remove any overlapped or intersecting surface elements. The small mesh size ensured that structural details were captured after shrink-wrapping. Geomagic Studio (Raindrop Geomagic, Durham, N.C.) was then used to fill any small holes in the resulting surface mesh. A mesh density function was applied to the aneurysmal volume and coil surfaces. The density function was employed to adequately resolve the device geometry and high flow velocity gradients. Further, the density function enhanced the mesh quality near the device, resulting in fewer sharp transitions in mesh element size. Multi-body parts were then defined for the blood and the solid volume. Lastly, the patch independent Octree mesh generator was used to discretize the coil and blood volume into a total of 19-25 million tetrahedral elements, corresponding to 5-7 million nodes. An example of a finalized surface and volume mesh is presented in FIGS. 12A-B. In particular, FIG. 12A illustrates a tetrahedral surface mesh of a single embolic coil 1200, and FIG. 12B illustrates a blood volume mesh 1210 for an example basilar tip aneurysm 1220 having the coil 1200 inserted therein. The empty spots 1230 within the aneurysm 1220 sac indicate the presence of the coil 1200. The blood flow volume may be discretized at a higher mesh density (i.e., higher number of triangular or tetrahedral elements per unit volume) in the region of the aneurysm 1220 sac to better resolve complicated flow dynamics that occur in those areas, as compared to simpler flows such as approximate the basilar split 1240.

Meshing High Porosity Stents

The meshing process for high porosity stents may include the construction of a virtual topology of the stent surface. Joint surfaces and edges may be merged using a defined set tolerance. Maximum and minimum mesh element sizes may then be defined for the virtual cells.

In the case of telescoping stents, some intersecting or overlapping regions may be present because of the penalty contact formulation used. Overlaps may be excluded from the geometry through the use of a volume-mesh filling approach. In this approach, multiple filling points may be defined for a single telescoped stent body. The Octree mesh generator may be used as above to create a volume mesh that encompasses all the stent bodies. After volume mesh generation, the Octree solver projects the outermost volume mesh layer onto the stent surface resulting in a single, merged, surface mesh of several telescoping stents. The volume mesh may be discarded, and the surface mesh may be converted into a facet geometry with non-intersecting edges retained.

A mesh density function may be applied to the blood volume near the faceted stent. The final blood and stent volume mesh may be generated using the same techniques outlined for embolic coils. Lastly, the generated surface and volume meshes may be imported into ANSYS Fluent software (ANSYS, Inc., Canonsburg, Pa., USA) for fluid dynamic simulation.

Meshing Flow Diverters

Each set of beam elements representing a flow diverter strand were first swept in Matlab using a custom built code. Beam elements were swept with a circular surface with a diameter equivalent to the strand diameter of the flow diverter. The resulting swept model was imported into ANSYS ICEM and a mesh density function was applied around the flow diverter geometry. Multi-body parts were then defined for the blood and flow diverter volume. Last, the patch independent Octree method was employed to discretize the blood and flow diverter volume into 30-40 million tetrahedral elements.

The terms "processor", as used herein is a broad term, and is to be given its ordinary and customary meaning to a person of ordinary skill in the art (and is not to be limited to a special or customized meaning), and refer without limitation to a computer system, state machine, processor, or the like designed to perform arithmetic or logic operations using logic circuitry that responds to and processes the basic instructions that drive a computer. In some embodiments, the terms can include ROM and/or RAM associated therewith.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical steps, blocks, modules and circuits described in connection with the present disclosure (such as the steps of FIGS. 1 and 9) may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an electronic communication device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an electronic communication device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention, e.g., as including any combination of the listed items, including single members (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Headings are included herein for reference and to aid in locating various sections. These headings are not intended to limit the scope of the concepts described with respect thereto. Such concepts may have applicability throughout the entire specification.

The foregoing illustrated embodiments have been provided solely for illustrating the functional principles of the present invention and are not intended to be limiting. For example, the present invention may be practiced using different overall structural configuration and materials. Persons skilled in the art will appreciate that modifications and alterations of the embodiments described herein can be made without departing from the spirit, principles, or scope of the present invention. The present invention is intended to encompass all modifications, substitutions, alterations, and equivalents within the spirit and scope of the following appended claims.

What is claimed is:

1. A system for simulating medical device dynamics, the system comprising:
    a database disposed in a server and configured to store medical device models of different sized embolic coils, each model being represented by a plurality of serially linked beam elements with a virtual diameter that is equal to a filament diameter of the embolic coil;
    a user interface configured to receive clinical data of a patient, wherein the user interface is configured to allow a user to select a plurality of the medical device models from the database; and
    one or more processors configured to:
        virtually construct each of the medical device models in air by modeling a 3D curve with multiple helical loops around a sphere at different angles;
        virtually construct each of the medical device models by stretching ends of each of the medical device models until the medical device model fits within a virtual microcatheter;
        virtually construct an anatomical structure model of the patient;
        simulate a deployment of the plurality of the medical device models in the anatomical structure model, wherein simulating deployment comprises:
            modeling advancing of each medical device model along a centerline of a vessel of the anatomical structure model by applying displacement boundary conditions to nodes at a distal tip of the virtual microcatheter to guide the virtual microcatheter along the centerline of the vessel to a treatment region of the anatomical structure model, and
            generating at least one surface mesh and at least one blood volume mesh by (1) sweeping the beam elements of each medical device model with a circular surface of a first diameter to produce swept embolic coil surfaces, (2) shrink-wrapping the swept embolic coil surfaces to remove overlapping and intersecting elements, and (3) applying an Octree mesh filing technique to the at least one blood volume;
        simulate hemodynamic outcomes after simulating the deployment of the plurality of the medical device models in the anatomical structure model;
        generate a report comprising one or more of hemodynamic outcome data and medical device model performance data; and
        select a medical device for use in an endovascular medical device placement procedure based at least in part on one or more of the hemodynamic outcome data and the medical device model performance data.

2. The system of claim 1, wherein the stored medical device models are constructed using finite element modeling and three dimensional beam theory.

3. The system of claim 1, wherein simulating hemodynamic outcomes comprises applying computational fluid dynamics.

4. The system of claim 1, wherein the one or more processors are arranged in a computer cluster.

5. The system of claim 1, wherein the anatomical structure model comprises one or more blood vessels.

6. The system of claim 5, wherein the anatomical structure model comprises at least one flow rate within one or more of the blood vessels.

7. The system of claim 1, wherein the embolic coil is a complex coil or a helical coil.

8. The system of claim 1, wherein the anatomical structure model comprises a computational model.

9. The system of claim 1, wherein the medical device models comprise one or both of a surface mesh and a CAD geometry.

10. The system of claim 1, wherein simulating the deployment comprises modeling contacts between each medical device model and the anatomical structure model with a penalty contact enforcement algorithm.

11. A method for simulating medical device dynamics, the method comprising:

storing in a server a computer readable database comprising medical device models of different sized embolic coils, each model being represented by a plurality of serially linked beam elements with a virtual diameter that is equal to a filament diameter of the embolic coil;

receiving clinical data of a patient;

selecting a plurality of the medical device models from the database;

virtually constructing, by the one or more processors, each of the medical device models in air by modeling a 3D curve with multiple helical loops around a sphere at different angles;

virtually constructing, by the one or more processors, each of the medical device models by stretching ends of each of the medical device models until the medical device model fits within a virtual microcatheter;

virtually constructing, by the one or more processors, an anatomical structure model based on the patient clinical data;

simulating a deployment of the plurality of the medical device models in the anatomical structure model, wherein simulating deployment comprises:

modeling advancing of each crimped medical device model along a centerline of a vessel of the anatomical structure model by applying displacement boundary conditions to nodes at a distal tip of the virtual microcatheter to guide the virtual microcatheter along the centerline of the vessel to a treatment region of the anatomical structure model, and generating at least one surface mesh and at least one blood volume mesh by (1) sweeping the beam elements of each medical device model with a circular surface of a first diameter to produce swept embolic coil surfaces, (2) shrink-wrapping the swept embolic coil surfaces to remove overlapping and intersecting elements, and (3) applying an Octree mesh filing technique to the at least one blood volume;

simulating hemodynamic outcomes after simulating the deployment of the plurality of the medical device models in the anatomical structure model;

generating a report comprising one or more of hemodynamic outcome data and medical device model performance data; and selecting a medical device for use in an endovascular medical device placement procedure based at least in part on one or more of the hemodynamic outcome data and the medical device model performance data.

12. The method of claim 11, wherein the stored medical device models are constructed using finite element modeling and three dimensional beam theory.

13. The method of claim 11, wherein simulating hemodynamic outcomes comprises applying computational fluid dynamics.

14. The method of claim 11, wherein the one or more processors are arranged in a computer cluster.

15. The method of claim 11, wherein the anatomical structure model comprises one or more blood vessels.

16. The method of claim 15, wherein the anatomical structure model comprises at least one flow rate within one or more of the blood vessels.

17. The method of claim 11, wherein the embolic coil is a complex coil or a helical coil.

18. The method of claim 11, wherein the anatomical structure model comprises a computational model.

19. The method of claim 11, wherein the medical device models comprise one or both of a surface mesh and a CAD geometry.

20. The method of claim 11, wherein simulating the deployment comprises modeling contacts between each medical device model and the anatomical structure model with a penalty contact enforcement algorithm.

* * * * *